United States Patent [19]

Sherdan

[11] Patent Number: 4,706,941

[45] Date of Patent: Nov. 17, 1987

[54] SNAIL AND SLUG ELECTRICAL BARRIER

[76] Inventor: Thomas L. Sherdan, 18161 Daves Ave., Monte Sereno, Calif. 95030

[21] Appl. No.: 906,448

[22] Filed: Sep. 12, 1986

[51] Int. Cl.$^4$ .................................. A01K 3/00
[52] U.S. Cl. ............................. 256/10; 47/32
[58] Field of Search ........................ 256/10; 47/32

[56] References Cited

U.S. PATENT DOCUMENTS 4,118,752  10/1978  Iguchi ............................ 256/10 X

FOREIGN PATENT DOCUMENTS 7547     6/1918  Australia ........................... 47/32
3303077  8/1984  Fed. Rep. of Germany ........ 256/10
443773   2/1968  Switzerland ...................... 256/10

OTHER PUBLICATIONS

Francois Picart, *Escargots from Your Garden to Your Table*, Copyright 1978, p. 34.

*Primary Examiner*—Andrew V. Kundrat

[57] ABSTRACT

A barrier comprised of two or more adjacent conductive surfaces with each conductive surface having a sufficient width to insure that when all the conductive surface widths are added together, the largest snail to be protected against cannot step over the combined width; also all adjacent conductive surfaces are separated by a minimal insulating gap so that the smallest snail to be protected against cannot step over the insulating gap without contacting at least two adjacent conductive surfaces at one time. Each adjacent conductive surface is powered so that it has an electrical potential difference from the adjacent conductive surfaces. Thus any snail, slug or similar gastropod mollusk attempting to cross the barrier will receive an electrical shock that will inhibit it from crossing the barrier.

12 Claims, 6 Drawing Figures

SNAIL AND SLUG ELECTRICAL BARRIER

BACKGROUND

1. Field of Invention

This invention provides an electrical barrier that controls snails, slugs, and similar gastropod mollusks in their movement from one location to another whereby they can be prohibited from entering into selected areas.

2. Description of Prior Art

This invention is especially useful in the garden to keep snails, slugs and similar gastropod mollusks from attacking plants of value. Heretofore the gardener relied primarily on the use of poisons to control these pests. Poisons are potentially dangerous to people, animals, birds and the ecological environment in general. In search of a better way to contrtol these pests, electrical methods have been proposed in recent years. Three such approaches are disclosed in three patents: Swiss patent No. 443,773 granted to Infanger on Feb. 15, 1968, U.S. Pat. No. 4,118,752 granted to Iguchi on Oct. 3, 1978 and German patent No. 3303077 granted to Bohm on Aug. 2, 1984. Infanger, in his patent, places a pair of horizontally spaced narrow conductors, like wires, around the area to be protected. He sends an electrical impulse throught the conductors timed to catch the snail as it bridges the two conductors and thereby kill the snail. This method requires the use of precisely spaced conductors, complex pulsing circuitry, a high current power source and a complex relationship between the conductor spacing, the snail size and the pulse timing. Iguchi, in his patent, places a pair of narrow, parallel exposed metal conductors, like wires, around the inside of an enclosure. He puts a snail bait inside the enclosed area and sends an electrical impulse through the conductors timed to catch the snail bridging the two conductors as the snail attempts to leave the enclosure, thus making the snail contract and fall back into the enclosure and get trapped. This method also requires the use of precisely spaced conductors, complex pulsing circuitry, relatively high power supply current and a complex relationship between the conductor spacing, the snail size and the pulse timing. Since this method is a trap, it relies upon attracting the snails into an area to get rid of them as opposed to controlling the snails movement by enclosing areas to be protected. Bohm, in his patent, like Infanger and Iguchi, relies upon two narrow horizontally spaced conductors, such as wires. The spacing between the conductors is critical since, if the spacing is too close, a large snail can step over the two conductors and, if the spacing is too wide, a small snail can travel over the first wire before contacting the second wire. Critical conductor spacing, complex pulse circuitry, high power supply current and critical timing requirements are disadvantages that increase the complexity, reduce the effectiveness and limit the usefulness of the electrical snail and slug control approaches available to date.

OBJECTS AND ADVANTAGES

Accordingly the object and advantages of this invention are: To provide an effective snail, slug and similar gastropod mollusk control barrier that has none of the above mentioned disadvantages. This invention controls snails and slugs of all sizes with equal success, requires no complex circuitry and requires no critical pulse timing. The power supply required is low voltage and low current, milliamperes, making the barrier useable with common flashlight batteries in remote areas of the garden. The barrier is simple to understand and easy to install.

DRAWING FIGURES

DRAWING REFERENCE NUMERALS

Figure 1:
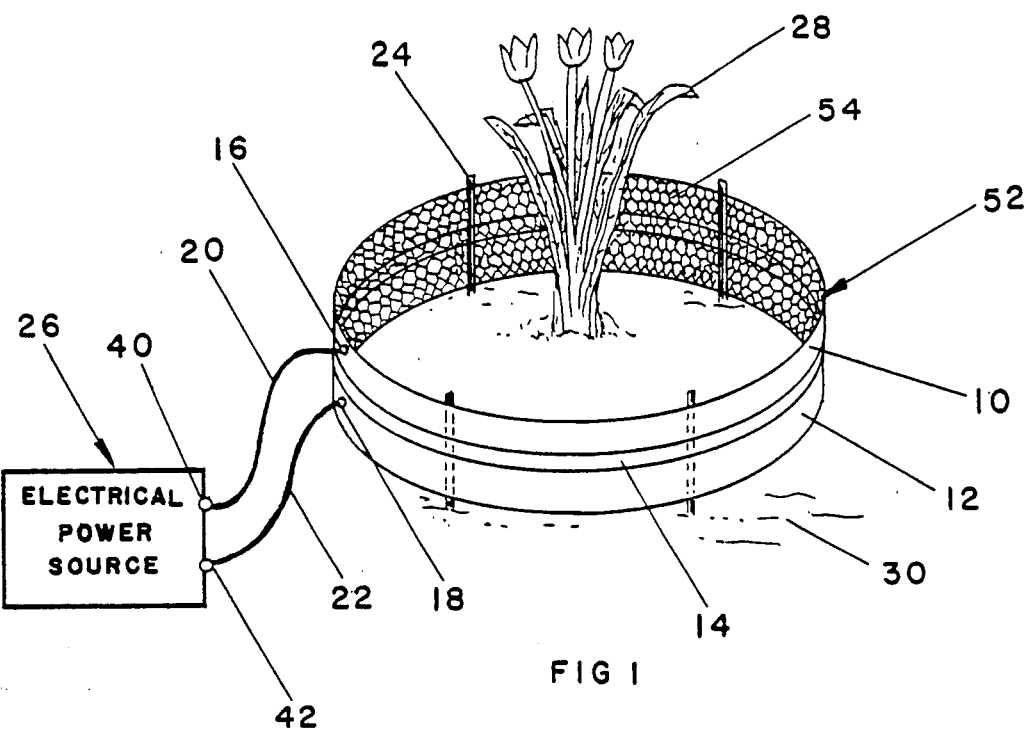
FIG. 1 illustrates an electrical barrier positioned on the ground as protection for a small plant in accordance with the invention.

The following reference numerals designate the same elements in all the drawing figures.

10 conductive surface #1
12 conductive surface #2
14 electrically insulating gap
16 electrical attach point to conductive surface #1
18 electrical attach point to conductive surface #2
20 electrical supply wire to conductive surface #1
22 electrical supply wire to conductive surface #2
24 insulated stake
26 electrical power source
28 typical garden plant
30 garden dirt (earth)
32 mechanical barrier
34 raised garden planter
36 electrical power source battery
38 incandescent lamp
40 electrical power source output terminal
42 electrical power source output terminal
44 AC transformer
46 AC input terminal
48 AC input terminal
50 DC bridge rectifier circuit
52 electrical barrier assembly
54 non conductive mounting material

ELECTRIC BARRIER—DESCRIPTION

FIG. 1 illustrates one embodiment of the snail, slug or other gastropod mollusk electrical barrier in accordance with the invention. The electrical barrier is comprised of two conductive surfaces 10 and 12 separated by an electrically insulating gap 14. The two conductive surfaces 10 and 12, made of aluminum or some other conductive material typically about two inches wide and about 0.01 inch thick, separated by an electrically insulating gap 14, typically about 1/16 inch wide being air or some other insulating material, held together by a suitable non-conductive mounting material 54 such as a plastic mesh or strip attached to the conductive surfaces 10 and 12 by some suitable means such as staples, screws, rivets, glue, etc., form an electrical barrier assembly 52. The electrical barrier assembly 52 can vary in height and diameter from typically four inches high by two feet in diameter for the single garden plant 28 application shown to any desired height and diameter for other applications. The electrical barrier assembly 52 is held in position on the garden dirt 30 by insulated stakes 24, made of a material like plastic, bamboo, etc. that attach to the electrical barrier assembly 52. The electrical barrier assembly 52 is positioned around the garden plant 28 or other object to be protected that could be put in the electrical barrier assembly 52 in place of the garden plant 28. The two conductive surfaces 10 and 12 are supplied power at two terminals 16 and 18 by means of two wires 20 and 22 that receive power from two output terminals 40 and 42 of an electrical power source 26.

Figure 2:
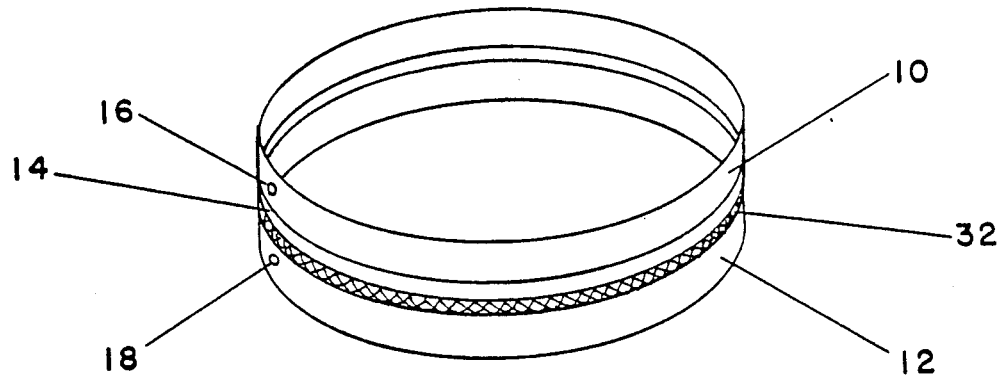
FIG. 2 illustrates an electrical barrier as shown in FIG. 1 with an additional mechanical barrier device.

FIG. 2 illustrates another embodiment of the FIG. 1 electrical barrier where a mechanical barrier 32 has been added to the upper edge of the lower conductive surface 12 just below the electrically insulating gap 14. The mechanical barrier material is aluminum mesh or any other sharp, jagged conductive material, typically about one inch wide, that is difficult for a snail, slug or other gastropod mollusk to adhere to.

Figure 3:
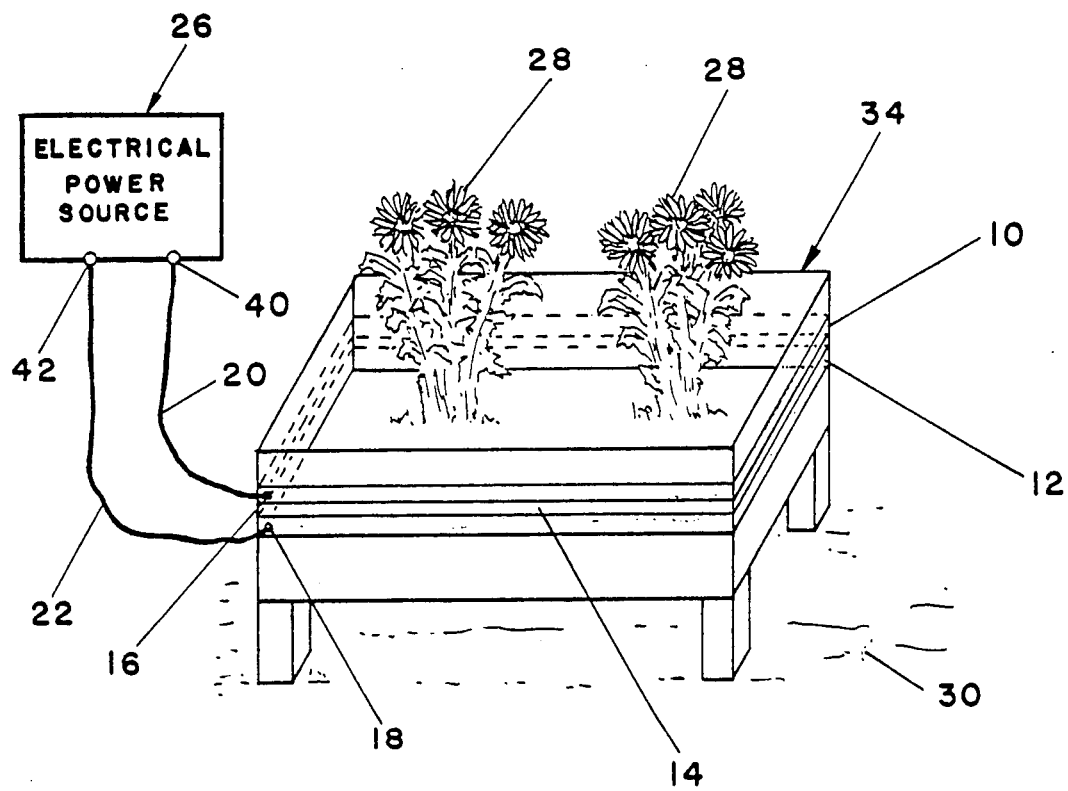
FIG. 3 illustrates an electrical barrier positioned around a garden planter.

FIG. 3 shows a raised garden planter 34 with garden plants 28 growing therein protected by another embodiment of the present invention: namely two conductive surfaces 10 and 12 made of aluminum or some other conductive material, typically about one inch wide and about 0.01 inch thick, attached to the planter by a suitable means like small nails (not shown), separated by an electrically insulating gap 14, typically 1/16 inch in width. The two conductive surfaces 10 and 12 are supplied power at two terminals 16 and 18 by means of two wires 20 and 22 that receive power from two output terminals 40 and 42 of an electrical power source 26.

Figure 4:
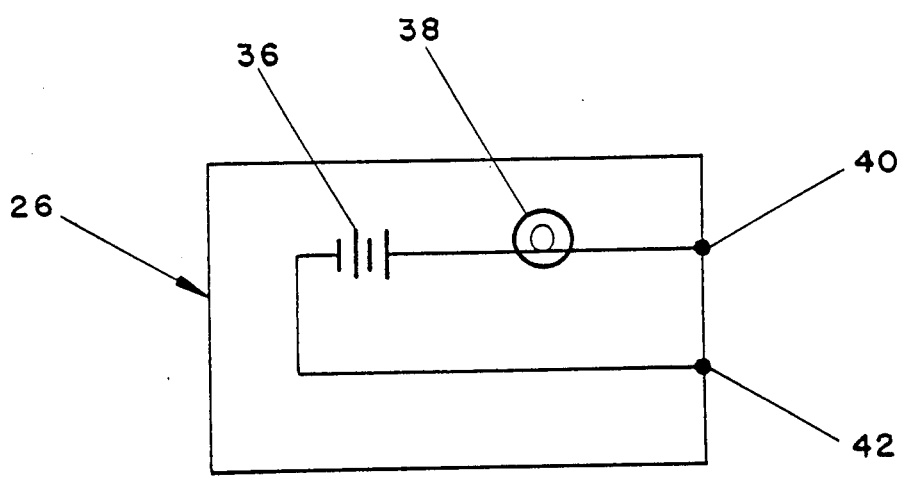
FIG. 4 illustrates a typical form of electrical power source using batteries.

FIG. 4 shows one typical form of electrical power source 26 that can be used to power the present invention. It consists of a battery or series of batteries 36, typically four 1.5 volt "D" cells connected in series for a total potential of 6 volts, connected in series with an incandescent lamp 38, typically a 6 volt 100 milliampere lamp, connected output terminals 40 and 42.

Figure 5:
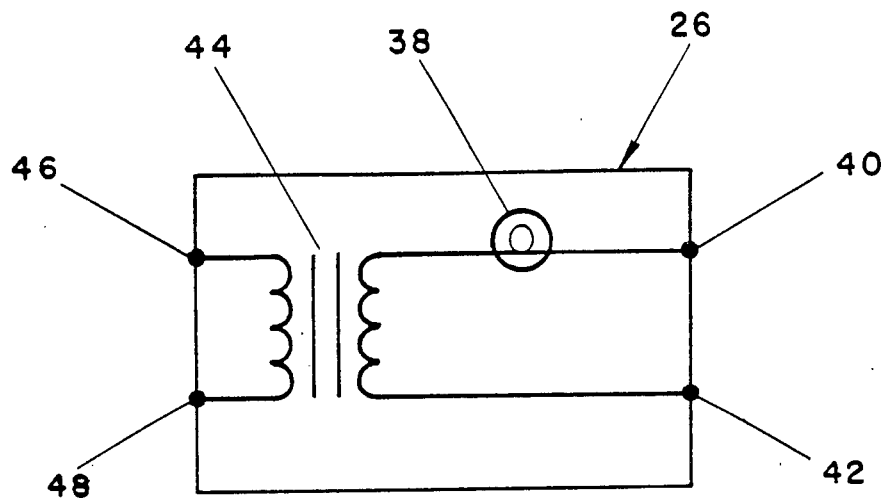
FIG. 5 illustrates a typical form of electrical power pource using an alternating current input and a alternating current output.

FIG. 5 shows another typical form of electrical power source 26 that can be used to power the present invention. It consists of a transformer 44 supplied with power to the input winding at terminals 46 and 48, typically 115 volts alternating current, with its output winding, typically 6 volts alternating current at 300 milliamperes, connected in series with an incandescent lamp 38, typically a 6 volt 100 milliampere lamp, connected to output terminals 40 and 42.

Figure 6:
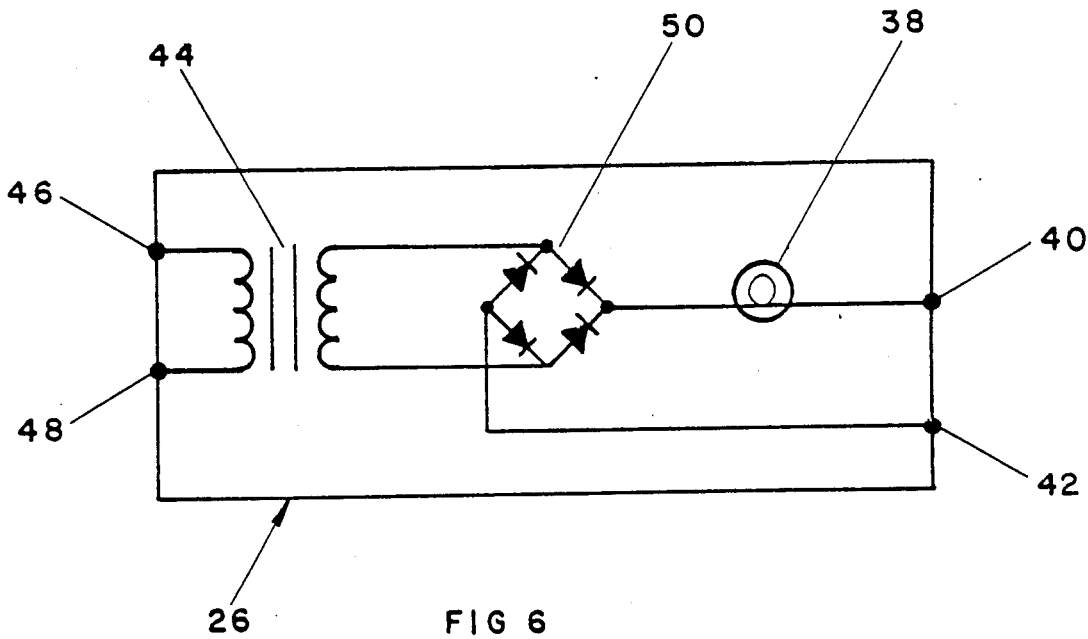
FIG. 6 illustrates a typical form of electrical power source using an alternating current input and a rectified direct current output.

FIG. 6 shows another typical form of electrical power source 26 that can be used to power the present invention. It consists of a transformer 44 supplied with power to the input windings at terminals 46 and 48, typically 115 volts alternating current, with its output winding, typically 6 volts alternating current at 300 milliamperes, connected to the DC bridge rectifier circuit 50, and connected in series with an incandescent lamp 38, typically a 6 volt 100 milliampere lamp, connected to output terminals 40 and 42.

ELECTRICAL BARRIER—OPERATION

FIG. 1 illustrates one embodiment of the snail, slug or other gastropod mollusk electrical barrier. It operates to protect the garden plant 28, or some other object to be protected than can be put in place of the garden plant 28, by being positioned around the object to be protected. A snail, slug or other gastropod mollusk wishing to reach the garden plant 28 from outside the barrier must traverse the conductive surfaces 10 and 12. The electrical power source 26 supplies power to conductive surfaces 10 and 12 from output terminals 40 and 42 through wires 20 and 22 that connect to the conductive surfaces 10 and 12 at terminals 16 and 18. Conductive surfaces 10 and 12 are insulated from each other by the electrically insulating gap 14 enabling the electrical power source 26 to maintain a potential difference between the conductive surfaces 10 and 12. The snail or slug is able to move from the garden dirt 30 to the first conductive surface 12 with no restriction. However, as the snail or slug attempts to cross the electrically insulating gap 14 and encounters the second conductive surface 10, the snail or slug receives an electrical shock due to the potential difference between the two conductive surfaces 10 and 12. This shock stops the snail or slug from traversing the electrically insulating gap 14. FIG. 1 shows one embodiment illustrating a circular electrical barrier assembly 52 positioned around one garden plant 28. The operation of the FIG. 1 embodiment can be extended to all similar embodiments of different lengths and shapes that would be required to enclose any number of garden plants or other objects requiring protection. The embodiment of FIG. 1 shows four stakes 24 holding the electrical brrier in position. These stakes 24 must be increased in quantity as the length of the electrical barrier is increased to the quantity needed to assure that the electrical barrier can be held firmly in place.

FIG. 2 illustrates another embodiment of the FIG. 1 electrical barrier where a mechanical barrier 32 has been added to the lower conductive surface 12. In operational situations where large numbers of snails are present, the snails have a tendency to collect on the lower conductive surface 12 just below the electrically insulating gap 14. As the snails gather in clumps just below the electrically insulating gap 14, one snail is sometimes able to travel over the shell of another snail that is adhering to the conductive surface 12 just below the electrically insulating gap 14. The shell of the snail adhering to the conductive surface 12 acts as an insulator for the second snail and allows the second snail to contact the second conductive surface 10 without receiving an electrical shock. In this way the second snail is able to traverse the electrical barrier. To stop the snails from gathering in clumps on the first conductive surface 12, the mechanical barrier 32 is attached to the top of the conductive surface 12. The mechanical barrier 32 is made of a conductive material that is difficult for snails to adhere to, like a sharp, jagged wire mesh. This helps discourage the snails from gathering in clumps on the conductive surface 12. This enhances the operation of the electrical barrier by reducing the number of snails that might be in a position to traverse the barrier.

FIG. 3 shows another embodiment of the electrical barrier where the electrical barrier is attached directly to a garden planter. Conductive surfaces 10 and 12, with the electrically insulating gap 14 maintained between the conductive surfaces 10 and 12, are attached directly to the planter 34. Once in position on the garden planter 34, the electrical barrier operates in the same manner as described for the operation of the electrical barrier of FIG. 1.

FIG. 4 shows a typical type of electrical power source 26 that can be used to power the electrical barrier. Batteries 36 are connected in series with an incandescent lamp 38 and output terminals 40 and 42. The batteries 36 supply the required power. The incandescent lamp 38 provides two functions: It acts as a current limiter and warning device to the operator in the event of a short circuit between the conductive surfaces 10 and 12 of FIG. 1; It is used as a test indicator to check the batteries whereby the operator can momentarily short between the two conductive surfaces 10 and 12 of FIG. 1 and observe the brightness of the incandescent lamp 38.

FIG. 5 shows another typical type of electrical power source 26 that can be used to power the electrical barrier. It operates in the same manner as the FIG. 4 electrical power source with the exception that the batteries 36 in FIG. 4 are replaced with a transformer 44 and alternating current input power is supplied to the transformer 44 at terminals 46 and 48.

FIG. 6 shows another typical type of electrical power source 26 that can be used to power the electrical barrier. It operates in the same manner as the FIG. 5 electrical power source with the exception that the transformer 44 alternating current output is rectified by the diode rectifiers 50.

Thus the reader will see that the electrical barrier according to the present invention presents an effective, safe and easy means to control snails, slugs and other gastropod mollusks.

While my above description contains many specificities, the reader should not construe these as limitations on the scope of the invention, but merely as exemplifications of preferred embodiments thereof. Those skilled in the art will envision many other possible variations that are within its scope. For example, skilled artisans will readily be able to change the dimensions and shapes of the various embodiments. They will be able to envision many different materials to make the different components. They will envision operating the invention in a horizontal position as opposed to the described vertical position. They can operate the invention using many other types of electrical power source other than the typical ones described. They can omit the incandescent lamp from the electrical power source. They can operate the invention using an electrical power source that has a pulsed power output. They can operate the invention using an electrical power source that has a delay circuit that is made to sense the approach of a snail or slug before providing an electrical output. They can operate the invention using an electrical power source that outputs a higher or lower electrical potential. They can construct the invention using more than two conductive surfaces. They can construct the invention using different conductive surfaces like bare electrical wire etc. They can construct the invention using conductive surfaces much wider than those illustrated. They can use the invention for many other protective purposes like protecting animal feeds etc.

Accordingly, the reader is requested to determine the scope of the invention by the appended claims and their legal equivalents, and not by the embodiments illustrated.

I claim:

1. An electrical barrier for restricting the movement of snails, slugs and similar gastropod mollusks comprising:
    (a) A plurality of longitudinal conductive surfaces with each one of said conductive surfaces being of sufficient width so that the sum of the widths of all of said plurality of longitudinal conductive surfaces presents a distance sufficiently wide to insure that the largest snail or slug cannot step over the said plurality of longitudinal conductive surfaces without contacting at least two of said conductive surfaces simultaneously with the said width of each of said conductive surfaces being greater than the thickness of the said conductive surfaces, with adjacent said conductive surfaces being separated by a electrically insulating gap the width of said electrically insulating gap being of minimal size so that the smallest snails or slugs traversing said conductive surfaces is forced to contact at least two of said conductive surfaces simultaneously,
    (b) A terminal means for connecting an electrical power source to said conductive surfaces that provides an electrical potential difference between each adjacent said conductive surface whereby any snail, slug or similar creature of any size traversing said conductive surfaces will receive an electrical shock when contacting two or more of said conductive surfaces simultaneously,
    (c) A mounting means to which the said conductive surfaces are affixed in the said sequence and that maintains the said electrically insulating gap with said mounting means being of sufficient strength and rigidity to make the mounted assembly capable of functioning as said electrical barrier in a vertical or horizontal position.

2. The electrical barrier of claim 1 wherein said mounting means has a means to attach said mounted assembly to another structure.

3. The electrical barrier of claim 1 with the addition of a mechanical barrier affixed to one of said conductive surfaces that a snail, slug or similar gastropod mollusk would encounter if trying to traverse said electrical barrier, said mechanical barrier being a material that is sharp or jagged or otherwise difficult for a gastropod mollusk to adhere to.

4. An electrical barrier for restricting the movement of snails, slugs and similar gastropod mollusks comprising:
    (a) Two or more adjacent conductive surfaces with each of said conductive surfaces having a width greater in dimension than its thickness with each of said widths being wide enough so that the sum of all of the said widths of all of the said conductive surfaces equals a total width greater than the largest snail can reach across without contacting at least two of said conductive surfaces at the same time, with each of said conductive surfaces being electrically insulated from adjacent said conductive surfaces by an insulating gap of minimal width such that the smallest snail is not able to fit within the said insulating gap without touching at least two of said conductive surfaces simultaneously,
    (b) A mounting means to mechanically mount said conductive surfaces so as to insulate each of said conductive surfaces from adjacent conductive surfaces and to maintain said insulating gap between said conductive surfaces and to provide strength and rigidity sufficient to support said conductive surfaces in a vertical or horizontal position,
    (c) Means to electrically connect the said conductive surfaces to a power source and provide an electrical potential difference between each adjacent said conductive surface whereby any snail, slug or similar creature of any size traversing said conductive surfaces will receive an electrical shock when contacting two or more of the said conductive surfaces simultaneously.

5. The electrical barrier of claim 4 with the addition of a mechanical barrier affixed to one of said conductive surfaces that a snail, slug or similar gastropod mollusk would encounter if trying to traverse said electrical barrier, said mechanical barrier being a material that is sharp or jagged or otherwise difficult for a gastropod mollusk to adhere to.

6. An electrical barrier for restricting the movement of snails, slugs and similar creatures comprising:
   (a) Two or more adjacent strips of conductive material having a width greater than thickness arranged in a longitudinal manner with each of said widths of said strips being at least wide enough to insure that the sum of all the said widths of the said strips added together presents a distance that the largest snail or slug cannot reach across without contacting at least two of said strips simultaneously, with each of said strips being electrically insulated from adjacent said strips by an insulating gap of minimal width so that the smallest snail or slug cannot fit within said insulating gap without contacting at least two of said strips simultaneously,
   (b) A mounting means to mechanically mount said strips so as to electrically insulate adjacent said strips and maintain the said insulating gap,
   (c) Means to electrically connect said strips to a power source that provides an electrical potential difference between adjacent said strips whereby any snail, slug or similar creature of any size traversing said strips will receive an electrical shock when contacting two or more said strips simultaneously.

7. The electrical barrier of claim 6 with the addition of a mechanical barrier affixed to one of said strips that a snail, slug or similar creature would encounter if trying to traverse said electrical barrier, said mechanical barrier being a material that is sharp or jagged or otherwise difficult for a gastropod mollusk to adhere to.

8. The electrical barrier of claim 6 with a means to mount the said strips to another surface and maintain said insulating gap.

9. An electrical barrier for restricting the movement of snails, slugs and similar creatures comprising:
   (a) Two or more parallel adjacent planar conductive surfaces arranged in a longitudinal manner with each one of said conductive surfaces being of sufficient width so that the sum of the widths of all of said conductive surfaces is of sufficient width to insure that the largest snail or slug cannot step over said conductive surfaces without contacting at least two of said conductive surfaces simultaneously, with each one of said conductive surfaces being electrically insulated from the adjacent said conductive surfaces by means of an electrically insulating gap of minimal width so that the smallest snail or slug traversing said conductive surfaces is thereby forced to contact at least two of said conductive surfaces at the same time,
   (b) A mounting means to mechanically mount said conductive surfaces in sequence and to maintain said insulating gap between said conductive surfaces and to provide strength and rigidity sufficient to support mounted said conductive surfaces in a vertical or horizontal position,
   (c) Means to electrically connect the said conductive surfaces to a power source and provide an electrical potential difference between each adjacent said conductive surface whereby andy snail, slug or similar creature of any size traversing said conductive surfaces will receive an electrical shock when contacting two or more of said conductive surfaces simultaneously.

10. The electrical barrier of claim 9 with the addition of a mechanical barrier affixed to one of said conductive surfaces that a snail, slug or similar gastropod mollusk would encounter if trying to traverse said electrical barrier, said mechanical barrier being a material that is sharp or jagged or otherwise difficult for a gastropod mollusk to adhere to.

11. The electrical barrier of claim 9 with a means to mount the said conductive surfaces to another surface and maintain said insulating gap.

12. The electrical barrier of claim 4 with a means to mount the said conductive surfaces to another surface and maintain said insulating gap.

* * * * *

UNITED STATES PATENT AND TRADEMARK OFFICE
CERTIFICATE OF CORRECTION

PATENT NO. : 4,706,941

DATED : Nov. 17, 1987

INVENTOR(S) : Thomas L. Sheridan

It is certified that error appears in the above-identified patent and that said Letters Patent is hereby corrected as shown below:

Title page, Item [19] change "Sherdan" to --Sheridan--

Item [76] Inventor: change "Sherdan" to --Sheridan--

Col. 2, line 16, change "pource" to --source--

Col. 4, line 24, change "brrier" to --barrier--

Col. 8, line 25, change "andy" to --any--.

Signed and Sealed this

Fifth Day of April, 1988

Attest:

DONALD J. QUIGG

*Attesting Officer*      *Commissioner of Patents and Trademarks*